UNITED STATES PATENT OFFICE.

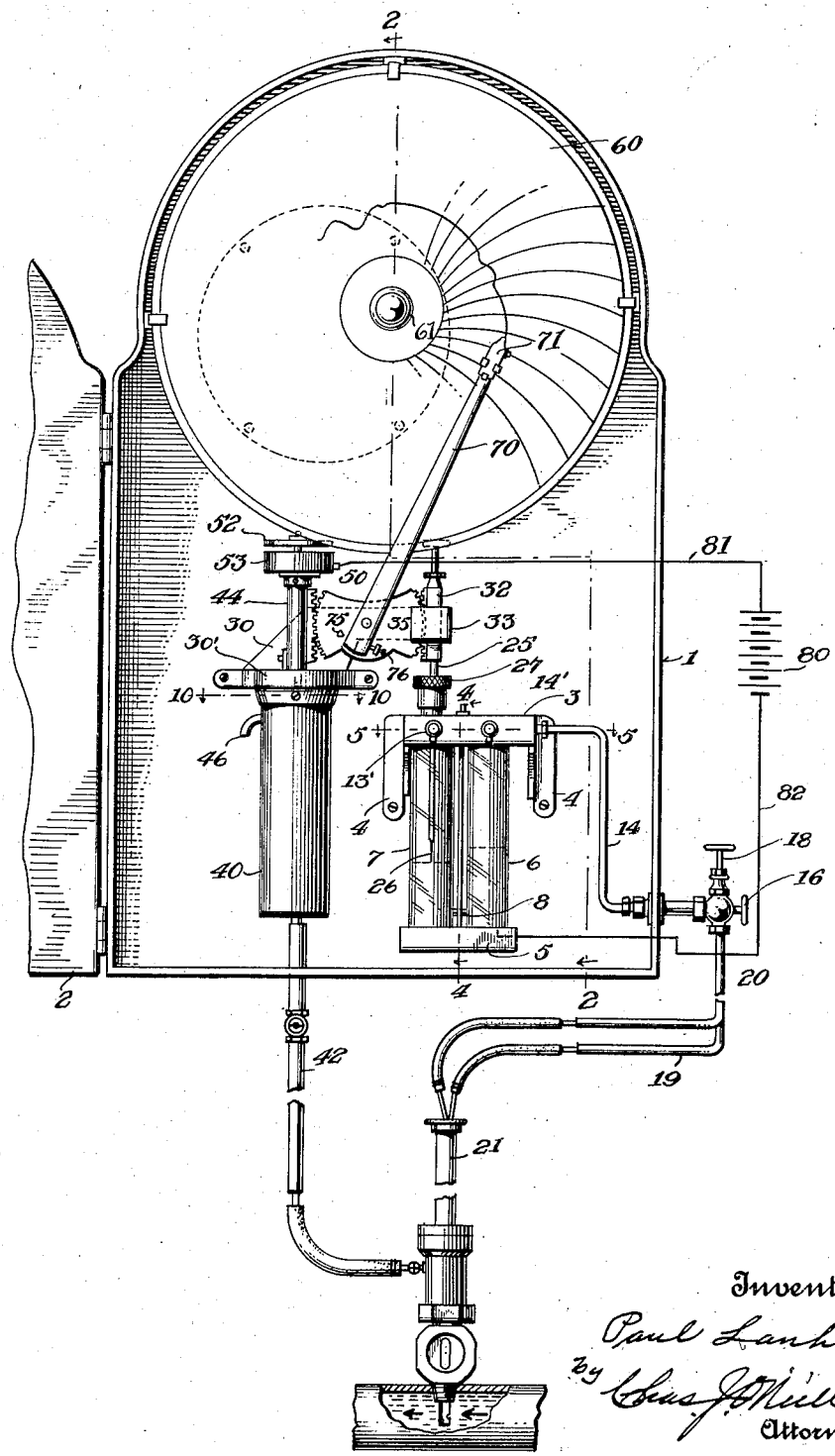

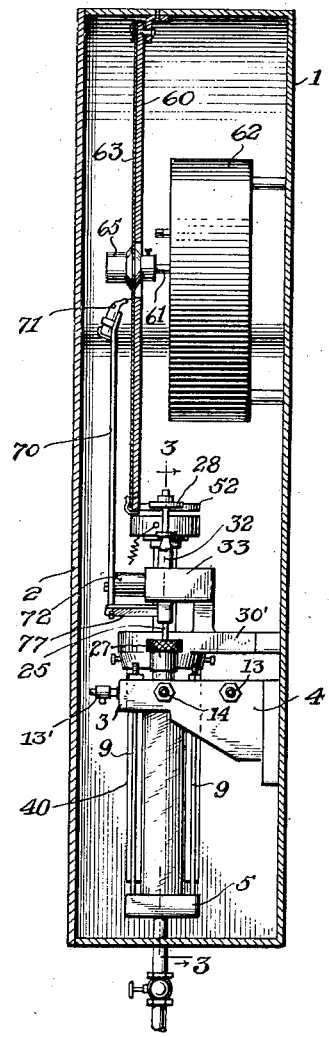
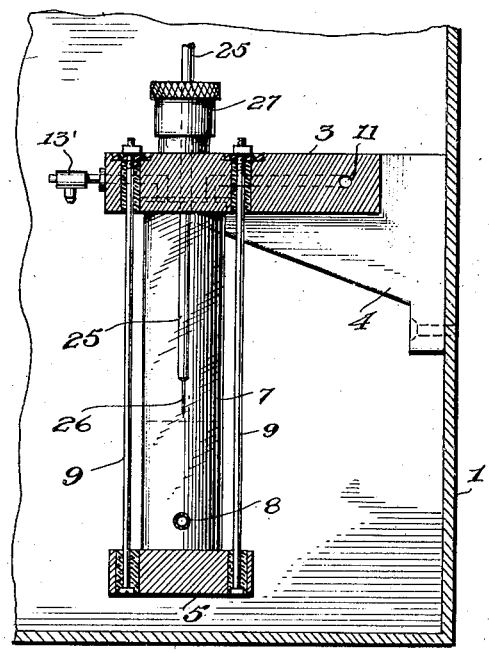
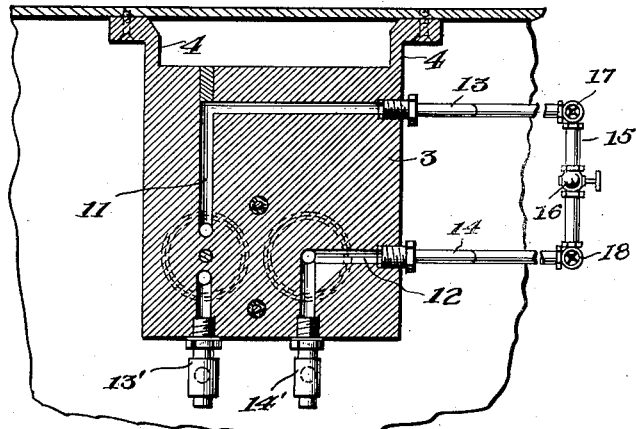

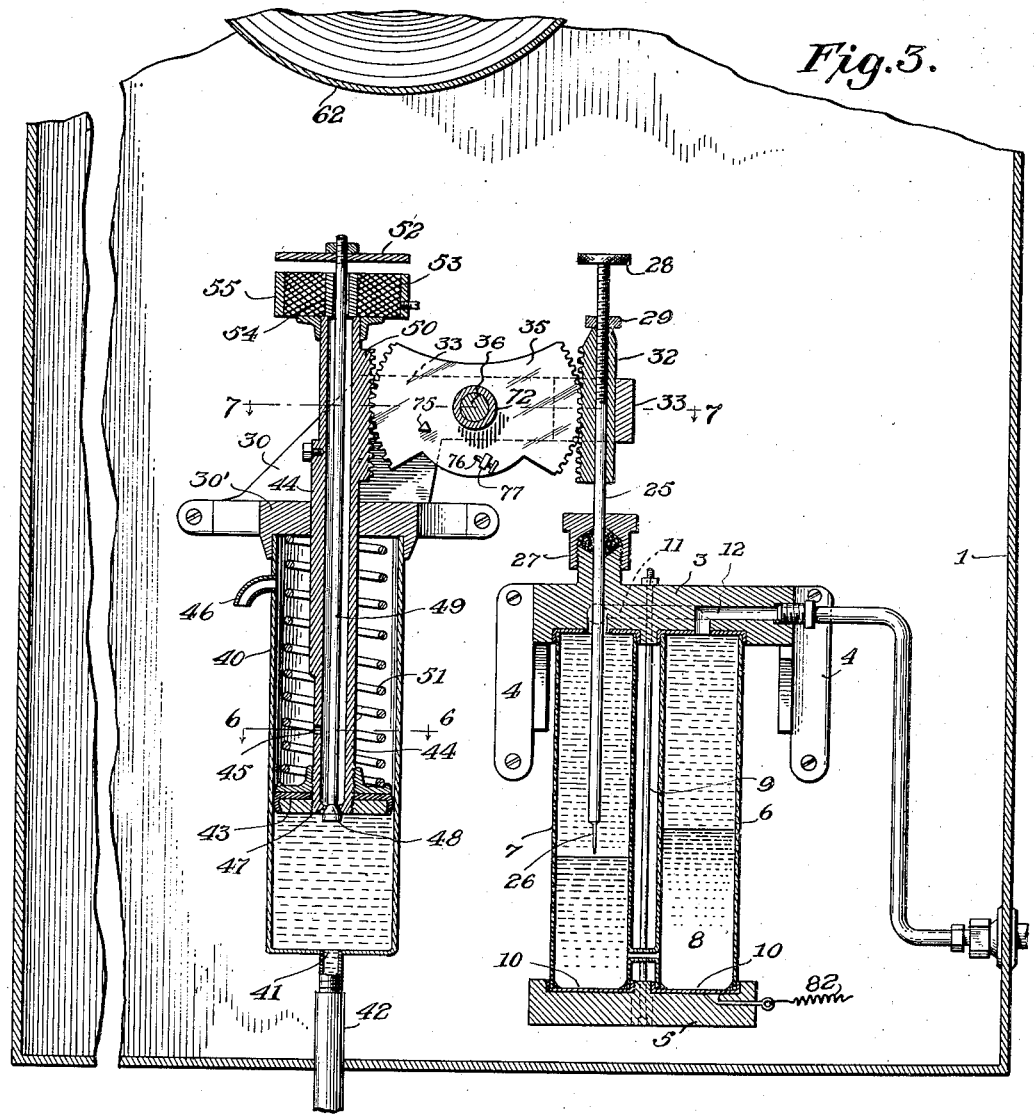

PAUL LANHAM, OF LANHAM, MARYLAND.

RECORDING-METER.

1,326,747.  Specification of Letters Patent.  Patented Dec. 30, 1919.

Application filed March 11, 1919. Serial No. 282,005.

*To all whom it may concern:*

Be it known that I, PAUL LANHAM, a citizen of the United States, residing at Lanham, county of Prince Georges, State of Maryland, have invented certain new and useful Improvements in Recording-Meters; and I do hereby declare the following to be a full, clear, and exact description of the invention, such as will enable others skilled in the art to which it appertains to make and use the same.

The invention relates to a recording meter or manometer for indicating and registering forces manifested as pressures or velocities, such as would be produced by the flow of fluids, and has for its object to materially simplify the apparatus, both structurally and operatively considered and to practically eliminate the occurrence of error in the recording operation, when the instrument has been adjusted, and to facilitate the adjustment of the apparatus to varying conditions of use and render the various parts capable of adjustment, repair and replacement, whenever such is found necessary. The mechanical simplicity of the apparatus renders the same exceptionally accurate and durable with little or no tendency to wear in any of the vital parts thereof or to suffer derangement of the operating elements under ordinary conditions of use. In the preferred form of the invention, there is involved a rotary disk recorder of the continuous fine line type, carrying a removable chart with which coöperates a suitable pen or stylus, which is moved in consonance with the variations in the force to be measured, which latter manifests itself by varying the hydrostatic head of a column of liquid, with which liquid column there is associated a fine wire, interpolated in an electric circuit, which is made and broken by the fine wire aforesaid engaging and disengaging the surface of the liquid column, said electric circuit being operated to effect, through suitable mechanism, a withdrawal of the contact wire, and a consequent breaking of the circuit, as soon as the circuit has been established by engagement of the end of the wire with the surface of the liquid column, so that the contact wire is thereby caused to reciprocate through a relatively short distance into and out of contact with the surface of the liquid column, and thereby to follow the variations in said liquid column, which variations correspond with the changes or variations in the force to be measured. In order to effect a regular, substantially uniform and relatively slow reciprocatory movement of the wire contact, the rod or element carrying the latter is appropriately connected to a reversible motor of suitable character, which in its forward movement advances the contact into engagement with the surface of the liquid column, wherever the said surface may be located, and the movement of the motor reversed under control of the electric circuit aforesaid as soon as the said circuit has been completed by the establishment of contact between the wire and the surface of the liquid column. As illustrated, the motor comprises a combined fluid pressure and spring actuated engine, the fluid pressure serving to operate the motor in one direction against the tension of the spring, and the spring effecting the reverse action of the motor when the fluid pressure thereon has been released, the latter operation being effected by means of a release valve associated with the motor piston and operated by an electromagnet carried by the rod of the motor piston, which magnet coöperates with an armature attached to the pressure relief valve and serving to operate the latter when the magnet is energized by the closure of the circuit between the contact wire and the liquid column. It will be understood, of course, that this particular type of motor is merely exemplary and that the apparatus may be effectively operated by various other types of reversible motors which may be controlled as to the particular direction of movement by the making and breaking of the circuit between the contact wire and the liquid column. The pen arm of the recorder is mounted upon a sector or gear which connects the piston rod of the motor with the reciprocating rod bearing the contact wire in such manner that the slight reciprocatory movement of the wire into and out of contact with the fluid column is not imparted to the pen, but the latter responds only to movements of the fluid column, so that the record made by the pen represents the variations in the force to be measured as indicated by the changes in the fluid column. The foregoing and other elements of novelty and utility in connection with the invention will be described in the annexed specification, predicated upon the accompanying drawings, in which:

Figure 1 is a vertical elevation of the apparatus as applied to measuring the flow of fluid in a main or pipe line.

Fig. 2 is a vertical section on line 2—2 of Fig. 1.

Fig. 3 is a sectional elevation on line 3—3 of Fig. 2.

Fig. 4 is a vertical section on line 4—4 of Fig. 1.

Fig. 5 is a horizontal section on line 5—5 of Fig. 1.

Fig. 6 is a horizontal section on line 6—6 of Fig. 3.

Figure 7:
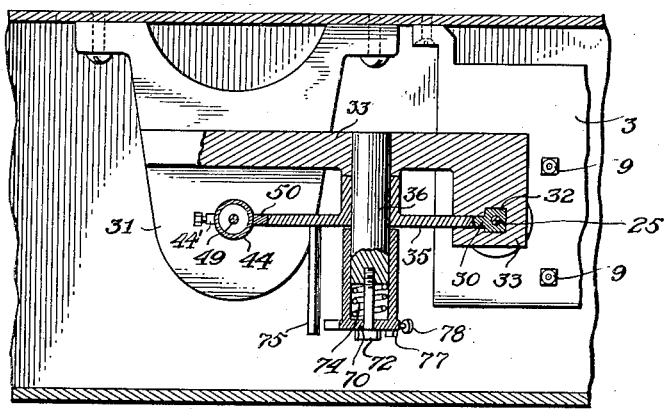
Fig. 7 is a horizontal section on line 7—7 of Fig. 3.
Figure 8:
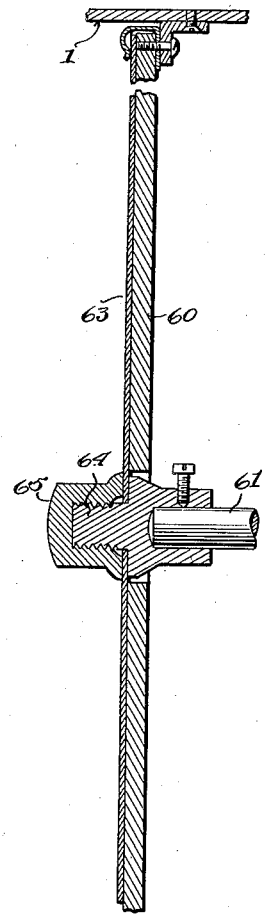
Fig. 8 is a vertical section through the recorder disk.
Figure 10:
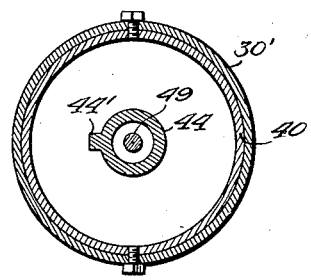
Fig. 10 is a horizontal section on lines 10—10 of Fig. 1.
Figure 9:
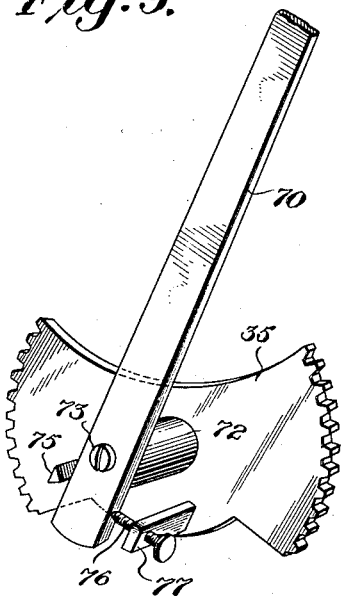
Fig. 9 is a perspective view of the sector carrying the pen arm.

Referring to the drawings, the numeral 1 indicates a suitable casing for the apparatus, provided with a hinged cover 2.

Mounted within the casing 1 is a manometer or U-tube consisting of two vertical tubular sections 6 and 7 connected by a transverse duct 8 above the bottom of the tubular sections, in order to afford a free passage of the mercury between the tubes and to exclude any foreign material which might tend to creep or collect toward the bottom of either of the tubes. The tubular members 6 and 7 are provided with top and bottom closure plates and are suspended from a bracket 3 secured by arms 4, 4 to the rear wall of the casing and supported from below by means of a plate 5 connected to the bracket 3 by tie rods 9. The joint between the lower edges of each tube 6 and 7 and the bottom plate is preferably sealed with a suitable composition which presents an annular inclined surface within the tubular members to prevent the trapping of water or other foreign material which would tend to collect in a sharp angular joint between the tube ends and the bottom plates 10.

The brackets member 3 is provided with angular channels or conduits 11 and 12 which communicate with the upper portions of the tubular members 6 and 7 of the U-tube and serve to admit the fluid, the flow or force of which is to be measured, to the respective legs of the U-tube above the surface of the mercury standing in the latter. The conduits 11 and 12 are connected by pipes 13 and 14 respectively which pass through the side wall of the casing and are provided at their outer ends with valves 17 and 18 respectively, and a by-pass 15 connects the said pipes 13 and 14 and is provided with a valve 16. The valves 17 and 18 are connected by pipes 19 and 20 with a suitable Pitot tube 21, which may be of any standard type and is provided with the usual impact and reference orifices at its lower end which latter is inserted in the fluid stream to be measured, as will be understood.

Suitable pet-cocks 13′, 14′ are connected by conduits in the bracket 3 with the upper portions of the respective legs of the U-tube to permit the latter to be blown out from time to time to remove any accumulated air or impurities which may collect in the U-tube, the blowing out action being effected by admitting sufficient pressure in one leg of the U-tube and diminishing the pressure in the other to force all of the mercury, above the cross connection 8, into one of the legs so that the impurities or entrapped air may rise through the mercury column and escape or be forced out through the corresponding pet-cock or valve 13′ or 14′, as the case may be.

The purpose of the by-pass is to permit the mercury column in the U-tube to assume its zero position, which is effected by closing the valve controlling one of the connecting pressure tubes and opening the by-pass, so that the pressures acting on the mercury in the two legs of the U-tube are equalized and the mercury stands at the same height in both legs. This is a necessary prerequisite to the adjustment of the recorder to the proper zero position, as will be hereinafter explained.

Mounted in a suitable stuffing box or gland 27, carried by the bracket 3 is a rod 25 adapted for reciprocatory movement longitudinally of the member 7 of the U-tube, and carrying at its lower end a fine platinum wire 26, which is adapted to be moved into and out of contact with the surface of the mercury column in the member or leg 7. The upper portion of the rod 25 is provided with a screw-threaded section and a knurled head 28, the screw-threaded section engaging threads on the interior of a rack member 32 which is guided in a slot in an arm 33 extending laterally from a bracket 30 secured to the rear wall of the casing 1. The screw-threaded engagement between the rack member 32 and the rod 25 is to permit the latter to be adjusted longitudinally so that the point of the wire 26 just touches the top of the mercury column in leg 7 when said column is at its zero position and the pen arm is on zero of chart. A suitable lock nut 29 permits the rod 25 to be locked in such adjusted position in the rack member 32.

Mounted on a spindle 36 carried by the bracket arm 33 is a toothed sector 35 which meshes on one side with the teeth of rack 32 and on the other side with the teeth on the piston rod of a motor, as clearly shown in Fig. 3, so that as the piston of said motor reciprocates, a corresponding reciprocation of the rack 32 and the connected rod 25 is produced. As shown, the sector produces equal and opposite movements of the rod 25 to the movements of the piston of the motor, but it will be obvious that, by properly designing the sector and the racks on the rod 25 and piston rod respectively, any desired differential movement of the rod 25 in respect of the piston rod may be obtained. This is of particular advantage inasmuch as it will admit of a single instrument being employed to measure widely variant forces, such as high or low velocities of water in a main by merely changing the manometer and the sector for others having the necessary capacity on the one hand and the gear ratio or radii on the other. For example, if the apparatus as illustrated is designed to measure relatively low velocities, and it is desired to employ the meter for measuring higher velocities, a U-tube of suitable capacity will be substituted for that shown, and a sector constructed to produce the proper ratio or proportionate movement as between the rod 25 and piston rod of the motor, will be substituted for the sector 35. This change will also necessitate a substitution of a chart adapted to properly indicate the higher velocities without, however, changing any other part of the apparatus except the arm 33 of the bracket 30 which may be made adjustable for this purpose.

Secured to the back wall of the casing 1 is a bracket 30 provided with a shelf-like element 30′ having a downwardly extending flange to which is secured a cylinder 40 having at its lower end an inlet 41, connected by a conduit 42 to any source of pressure and preferably connected by a valved tap to the casing of the Pitot tube, so that the fluid from the main to which the Pitot tube is connected may be admitted to the cylinder 40. Operating in the cylinder 40 is a piston 43 connected with a hollow piston rod 44 provided with a guide rib 44′ engaging a slot in the opening in bracket member 30′, through which the piston rod passes, to prevent rotation of the piston rod. The upper end of said hollow piston rod is provided with a rack 50 which coöperates with the teeth on one side of the sector 35 and serves to oscillate the sector as the piston and its rod reciprocate in the cylinder. Surrounding the piston rod above the piston is a relatively long helical spring 51 which tends to force the piston downward against the fluid pressure on the lower side of the piston. The lower end of the piston rod is provided with an orifice 47 in which seats a valve 48, opening downward and provided with a stem 49 which extends upwardly through the piston rod and has secured to its upper end an armature 52. The piston rod is provided with a lateral opening 45 to establish connection between the fluid on the lower side of the piston, and a discharge orifice 46 in the upper part of the cylinder when the valve 48 is opened, thereby relieving the fluid pressure on the lower side of the piston and permitting the spring 51 to force the piston downward. Suitable stops are provided on the cylinder and piston rod to limit the movement of the piston in both directions.

Secured to the upper end of the piston rod 44 is an annular electro-magnet 53 of the ironclad type having an annular exterior pole 55 and a similar annular interior pole 54, through which latter the valve stem 49 is guided, which magnet coöperates with the disk-like armature 52 and serves to attract the armature and unseat valve 48 when the magnet 53 is energized.

Current to energize magnet 53 is derived from a battery or other source 80 and is conducted to the magnet by means of a lead 81 and from the magnet by an appropriate connection to any of the metallic parts of the apparatus, such for example as the piston rod, so that the circuit will be completed from the rod 44 through the sector 35, rack 32, rod 25, contact wire 26, the mercury column in the U-tube to a return lead 82, connected to the bottom plate of member 6 of the U-tube, thence back to the negative pole of the battery 80, so that when the circuit from the battery 80 is closed, the current will pass from the point of contact wire 26 into the mercury, as soon as such point contacts the mercury surface.

Mounted in the upper part of the casing 1 on a suitable spindle 61, is a recorder disk 60, the spindle 61 being operated by suitable clock motor 62, as is usual in apparatus of this character. The spindle 61 is adapted to receive the usual paper chart 63 upon which the record is made, which chart is removably attached to the front end of the spindle by means of a shoulder on the spindle passing through a central opening in the disk and a lock nut 65 which clamps the chart in place.

Coöperating with the chart is an oscillating arm 70 carrying at its outer end a stylus or other marking device, preferably in the form of a capillary pen 71, which is maintained in constant contact with the face of the chart by reason of the normal resiliency of the arm 70. The lower end of said arm 70 is provided with a hollow boss which fits over the end of the stud 36 upon which the sector 35 oscillates and is frictionally held to said spindle by means of a helical spring 74 telescoped within the hollow boss and bearing on the end of the stud 36 and the bottom of the boss, the tension of the spring being regulated by a set screw 73 passing through the end of the pen arm 70 and engaging the stud 36. The frictional engagement between the pen arm and the stud 36, as produced by the spring 74, prevents movement of the pen arm until sufficient force is exerted on the latter to overcome pressure exerted by the spring. Effective recording movement of the pen arm is produced by movement of the sector 35, which, as will be noted, is concentric with the axis of the pen arm so that proper recording movements of the sector will be imparted to the pen arm and magnified by the recording element or pen 71 at the end of the pen arm 70. Connection is established between the sector 35 and the lower end of the pen arm by means of a fixed stop 75 projecting from the face of the sector and an adjustable screw stop 76 mounted in a stud 77 on the sector 35 and located opposite the fixed stop 75. This permits a relatively slight and variably adjustable movement of the sector 35, without producing any corresponding movement of the pen arm, and the fixed and adjustable stops therefor constitute a compensating connection between the sector and the pen arm which admits of the sector following the normal slight reciprocatory movements of the motor piston on the one hand and the contact carrying rod 25 on the other, without imparting corresponding movements or any movement to the pen arm, but nevertheless imparting a direct and positive movement to the pen arm corresponding to any variation in the movement of the rod 25, which is brought about primarily by the variation in the height of the liquid column in leg 7 of the U-tube.

The operation of the apparatus as described is as follows:

The Pitot tube is properly connected to the main in which the velocity of flow is to be measured, the mercury columns in the respective legs of the U-tube brought to the same elevation or zero position, by means of the by-pass as hereinbefore described, and the pen brought to the zero position on the chart by adjusting the rod 25 until the end of the contact wire 26 engages the surface of the mercury in leg 7 of the U-tube. Having established the zero position of the instrument, the by-pass is closed and the two valves 17 and 18 opened to admit pressure from the main through the members of the Pitot tube to the upper portions of the respective members of the U-tube. The apparatus is then in proper adjustment for recording the flow in the main for the entire period represented by the time divisions of the chart. The differential pressures on the respective sides of the U-tube causes a corresponding difference in elevation of the mercury columns in the respective tubes, which will be proportional to the velocity or rate of flow in the main, as represented by the difference in pressure at the impact orifice and the down-stream reference orifice of the Pitot tube. At the same time, pressure is admitted to the lower portion of the cylinder 40, by opening the valve in the connecting pipe 42. The fluid flowing into the cylinder 40 below the piston seats valve 48 and begins to move the piston 43 upward against the tension of spring 51. The movement of the piston is transferred, by means of the rack attached to the piston rod, to the sector 35 which in turn imparts a corresponding downward movement to the rod 25, which is continued until the end of contact wire 36 engages the surface of the mercury column, which immediately establishes a circuit from battery 80 through lead 81 to magnet 53, thence through the metallic parts of the apparatus to rod 25, contact wire 26, mercury column in the U-tube, thence by lead 82 back to the battery, care being taken that the battery be so connected that the current always flows from the contact 26 to the mercury and not in the reverse direction, as this precaution will result in maintaining the surface of the mercury clean and bright and establish an instantaneous circuit closure between the surface of the mercury and the extreme end of the contact wire 26, whereas if the current were permitted to flow in the opposite direction, a rapid fouling of the mercury surface would result. As soon as the circuit is closed between contact wire 26 and the mercury column, magnet 53 is energized and attracts armature 52, thereby unseating relief valve 48 and opening up a free passage for the fluid under pressure on the under side of the piston and permitting the fluid to escape through the hollow piston rod 44, the lateral orifice 45 therein and the vent pipe 46 in the upper part of the cylinder. The release of the fluid pressure on the under side of the piston permits the spring 51 to come into action and force the piston downward or a reverse direction of the movement produced by the fluid pressure. By regulating the opening 47 in the piston as controlled by the valve 48, the relief of the fluid pressure is made gradual so that the movement of the piston under the action of the spring is relatively slow, and similarly by selecting a spring of suitable power, the upward movement of the piston due to the fluid pressure on the lower side thereof, when the valve is closed, may be timed so that the movement of the piston in both directions may be rendered slow and uniform and no excessive strains or shocks will be imparted to any of the parts of the apparatus. Excessive movement of the piston in either direction is prevented by the stops arranged on the cylinder and piston rod and as these stops are located beyond the extreme range of movement of the apparatus in any normal recording operation, it will be apparent that a regular orderly record of the force to be measured will be produced on the chart. It will be noted that, so long as no variation in the velocity of flow in the main takes place and therefore no change in the differential levels of the mercury column in the respective legs of the U-tube occurs, the motor will operate to reciprocate the rod carrying the contact wire 26 through a slight interval of space approximating a fraction of an inch, the downward movement of the rod 25 bringing the contact wire into engagement with the mercury surface, whereupon an immediate reversal of the motor is effected in the manner described, and the contact rod is withdrawn until the end of the wire 26 is separated by a space interval from the mercury column, and this slight oscillatory movement of the motor and the rod 25 will be maintained indefinitely until a change in the rate of flow in the main takes place which will produce a change in the level of the mercury column, either raising or lowering the surface of the mercury in the leg 7 of the U-tube, as the velocity of flow in the main decreases or increases. So long as no change in the velocity of the fluid to be measured occurs, the pen will trace a circular record hair line on the chart representing the uniform rate of flow, because the pen does not follow the slight reciprocatory movements of the rod 25, produced by the motor and the connecting sector 35, because of the compensating connections between the pen arm 70 and the sector 35, as hereinbefore explained. Any change in the velocity of flow in the main, however, is instantly manifested in a change in the level of the mercury columns in the respective legs of the U-tube, the extent of the change of level in leg 7 being immediately followed by a corresponding change in the extent of movement of the rod 25 carrying the contact wire 26. To illustrate, if the velocity of the fluid in the main increases, the level of the mercury in leg 7 of the U-tube falls. Consequently, the next stroke of the piston of the motor, under the action of the fluid pressure in the lower part of the cylinder, is increased, because of the increased distance which the point of contact wire 26 must traverse before engaging with the surface of the mercury column. This increased movement of the motor, the rod 25 and the sector 35, over and above the normal extent of the reciprocatory and oscillatory movements of these elements, is imparted to the pen arm and the record line on the chart traced by the pen is accordingly varied in strict consonance with the variation in the velocity of the fluid in the main. Should the velocity of the fluid to be measured decrease, the mercury in leg 7 of the U-tube rises so that the next reciprocation of the rod 25 will bring the contact wire 26 into engagement with the mercury surface at an earlier period of the downward movement of said rod and cause a reversal of the motor at a corresponding earlier period, and inasmuch as the extent of movement of the motor piston and the rod 25, and the connecting sector 35 is substantially uniform, due to the time constance of the motor, the reverse movement of the motor piston will impart an extra increment of movement to the sector and to the pen arm 70 to appropriately vary the record line on the chart. Under all conditions of operation, however, the movement of the motor piston and the rod 25 is relatively small for any given reciprocation, and while the ultimate range of movement of these parts and of the pen may include the extreme recording limits of the apparatus, the slight reciprocatory motion of the motor in the contact bearing rod 25 is maintained constantly, so that the extreme end of the contact wire is always in relatively close proximity to the surface of the mercury in the leg 7 of the U-tube and any change in the level of its surface will be noted and recorded by the first upward or downward movement of the rod 25 following such change, and the motor and the rod will maintain its relatively small reciprocatory movement until another change in the mercury column, produced by a variation in the force to be measured, takes place.

While it is preferable to produce the record on the chart in the form of a uniform hair line, and this record can be effectively accomplished by the apparatus as shown, involving the compensating connection between the sector and the pen arm, nevertheless an entirely satisfactory record may be produced by rigidly attaching the pen arm to the sector, in which case the record will be manifested in the form of a band traced on the chart by the pen, of a width corresponding to the movement imparted to the pen by the relatively uniform reciprocation of the motor and the corresponding oscillation of the sector. Such a form of record marking will obviate the more or less accurate adjustment of the abutments, which serve to impart the movement of the sector to the pen arm, but will on the other hand produce a record which may lack in some degrees the sharpness and accuracy of the continuous hair line as produced by the apparatus as described.

It will be understood, of course, that the apparatus as hereinbefore described is merely typical, and that the claims hereto appended are to be regarded as covering all proper equivalents and modifications of the various elements employed, so long as they follow the general principle of operation. For example, any suitable type of motor may be employed in lieu of that shown, so long as the motor is of such a type that it will not produce a rapid vibration or reciprocation of the parts, which obviously is not desirable and may prove distinctly disadvantageous. A relatively slow motion of the motor and of the contact rod associated with the fluid column, involving several seconds of time, will produce entirely satisfactory results, as it will maintain the contact wire in close proximity to the surface of the mercury throughout all variations in the latter due to changes in the force to be measured, and inasmuch as the record line traced on the chart is regulated in its variations by the engagement of the contact wire with the mercury column, it is obvious that any change or variation in said column will be manifested at once in proper degree in the record line on the chart. Instead of a reciprocating motor, it will be apparent that a rotary motor may be employed, provided the same is associated with reversing gearing connecting the same with the contact rod, so that the latter will be caused to reciprocate toward and from the surface of the liquid column and will be caused to automatically follow the variations in the height of the liquid column.

Certain of the structural and operative features of the present invention are also shown and described in applicant's copending application, Serial No. 282,004, as coöperating with a somewhat different type of recorder.

What I claim is:—

1. A meter, comprising a fluid column variable with the force to be measured, a reciprocatory contact coöperating with the column, and a motor operating to engage the contact with the column and to reverse the movement of the contact immediately said engagement is effected, whereby the contact follows the column and the extent of movement of the contact varies with the variations in said column.

2. A meter, comprising a fluid column variable with the force to be measured, a reciprocatory contact coöperating with the column, a motor operating to engage the contact with the column and to reverse the movement of the contact when said engagement is effected, whereby the contact follows the column and the extent of movement of the contact varies with the variations in said column, and a recorder operated by said motor.

3. A meter, comprising a recorder, a fluid column variable with the force to be measured, a reciprocatory contact coöperating with said column, a motor for operating said recorder and said contact, a circuit completed by the engagement of the contact and column, and means operated by said circuit to effect a reverse movement of the contact by the motor and thereby break the circuit.

4. A meter, comprising a recorder, a reversible motor for operating said recorder, a fluid column variable with the force to be measured, and a reciprocatory contact coöperating with said fluid column actuated by said motor and controlling the extent of record making movement of said motor by first making and immediately breaking a circuit controlled by said contact.

5. A meter, comprising a fluid column variable with the force to be measured, a circuit including a reciprocatory contact coöperating with said column, a reversible motor actuating said contact, and means in said circuit to reverse the motor when the circuit is closed by said contact.

6. A meter, comprising a recorder, a fluid column variable with the force to be measured, a circuit including a reciprocatory contact coöperating with said column, a reversible motor operating said recorder and actuating said contact, and means in said circuit to reverse the motor when the circuit is closed by said contact.

7. A meter, comprising a recorder including a movable stylus, a fluid column variable with the force to be measured, a circuit including a reciprocatory contact coöperating with said column, a reversible motor operating said stylus and actuating said contact, and means in said circuit to reverse the motor when the circuit is closed by said contact.

8. A meter, comprising a recorder including a movable stylus, a fluid column variable with the force to be measured, a circuit including a reciprocatory contact coöperating with said column, a reversible motor operating said stylus and actuating said contact, and a magnet in said circuit to reverse the motor when the circuit is closed by said contact.

9. A meter, comprising a recorder, a fluid column variable with the force to be measured, a circuit including a reciprocatory contact coöperating with said column, a reversible motor operating said recorder and reciprocating said contact, and a circuit including an electromagnet energized by the engagement of the contact with the column to reverse the motor and withdraw the contact from the column.

10. A meter, comprising a fluid column variable with the force to be measured, a reciprocatory contact coöperating with the column, a motor, means connecting the motor and contact to operate the latter, and a circuit including said contact and means to effect reversal of the contact by the motor when the contact engages the column.

11. A meter, comprising a fluid column variable with the force to be measured, a reciprocatory contact coöperating with the column, a motor, means connecting the motor and contact to operate the latter, and a circuit including said contact and electromagnetic means to effect reversal of the contact by the motor when the contact engages the column.

12. A meter, comprising a fluid column variable with the force to be measured, a reciprocatory rod carrying a contact coöperating with said column, a motor, gearing connecting the motor and the contact rod, a circuit closed through said contact and column and including means to effect a reversal of the contact by the motor when said circuit is closed between the contact and column.

13. A meter, comprising a recorder, a fluid column variable with the force to be measured, a reciprocatory rod carrying a contact coöperating with said column, a reversible motor operating said recorder, gearing connecting the motor and the contact rod, a circuit closed through said contact and column and including means to effect a reversal of the motor when said circuit is closed between the contact and column.

14. A meter, comprising a recorder having a movable stylus, a fluid column variable with the force to be measured, a reciprocatory rod carrying a contact coöperating with said column, a reversible motor operating said stylus, gearing connecting the motor and the contact rod, a circuit closed through said contact and column and including means to effect a reversal of the motor when said circuit is closed between the contact and column.

15. A meter, comprising a fluid column variable with the force to be measured, a reciprocatory contact carrying a rod coöperating with said column, a reversible motor connected to said rod to actuate the same, a circuit including the column and contact and means to reverse the motor when said circuit is closed by the contact, a recorder having a movable stylus, and connections between the motor and stylus effective to move the stylus in accordance with variations in the fluid column.

16. A meter, comprising a fluid column variable with the force to be measured, a reciprocatory contact carrying a rod coöperating with said column, a reversible motor connected to said rod to actuate the same, a circuit including the column and contact and means to reverse the motor when said circuit is closed by the contact, a recorder having a movable stylus, and connections between the motor and stylus effective to move the stylus in accordance with variations in the fluid column, said connections being ineffective to move the stylus during the normal movements of the motor and rod.

17. A meter, comprising a fluid column variable with the force to be measured, a reciprocatory rod carrying a contact coöperating with said column, a reversible reciprocatory motor, gearing connecting the motor and rod, and a circuit including means to effect reversal of the motor when the contact engages the column, whereby the contact is reciprocated into and out of engagement with said column and variations in said column produce like variations in the succeeding stroke of the motor.

18. A meter, comprising a recorder having a movable stylus, a fluid column variable with the force to be measured, a reciprocatory rod carrying a contact coöperating with said column, a reversible reciprocatory motor, gearing connecting the motor and rod and operating said stylus, and a circuit including means to effect reversal of the motor when the contact engages the column, whereby the contact is reciprocated into and out of engagement with said column and variations in said column produce like variations in the succeeding stroke of the motor.

19. A meter, comprising a fluid column variable with the force to be measured, a reciprocatory rod carrying a contact coöperating with said column, a reversible motor including a cylinder, a piston, fluid pressure means for moving the piston in one direction, mechanical means for reversing the movement of the piston, racks carried by the contact rod and piston rod respectively, a toothed sector connecting said racks, a circuit closed by engagement of the contact with the column, an electromagnet in the circuit, and means actuated by said electromagnet to relieve the fluid pressure in the cylinder and cause the reversal of the motor upon closure of the circuit aforesaid.

20. A meter, comprising a recorder having a movable stylus, a fluid column variable with the force to be measured, a reciprocatory contact coöperating with said column, a reversible motor, connections between the motor and contact member to move the contact into and out of engagement with the column, a circuit closed between the contact and column and including means to effect reversal of the motor, connections between the stylus and gearing effective to move the stylus in accordance with variations in the fluid column and resultant variations in the movement of the motor.

21. A meter, comprising a recorder having a movable stylus-carrying arm, a fluid column variable with the force to be measured, a reciprocatory rod carrying a contact coöperating with said column, a reversible reciprocating motor including a cylinder, a piston operating therein, fluid pressure connections for moving the piston in one direction, a spring for reversing the movement of the piston, a hollow piston rod having relief openings for the fluid pressure, a valve controlling one of said openings and provided with a rod extending through said piston rod, gearing connecting the piston rod and contact rod to effect reciprocation of the latter, a circuit including an electromagnet carried by the piston rod, said circuit being opened and closed by the engagement and disengagement of the contact with the column, an armature on the valve rod adapted to unseat the valve when the electromagnet is energized, and connections between the gearing and the stylus to move the latter in consonance with variations in the fluid column.

In testimony whereof I affix my signature.

PAUL LANHAM.